(No Model.)
M. ROE.
HEATING APPARATUS.
No. 479,463. Patented July 26, 1892.
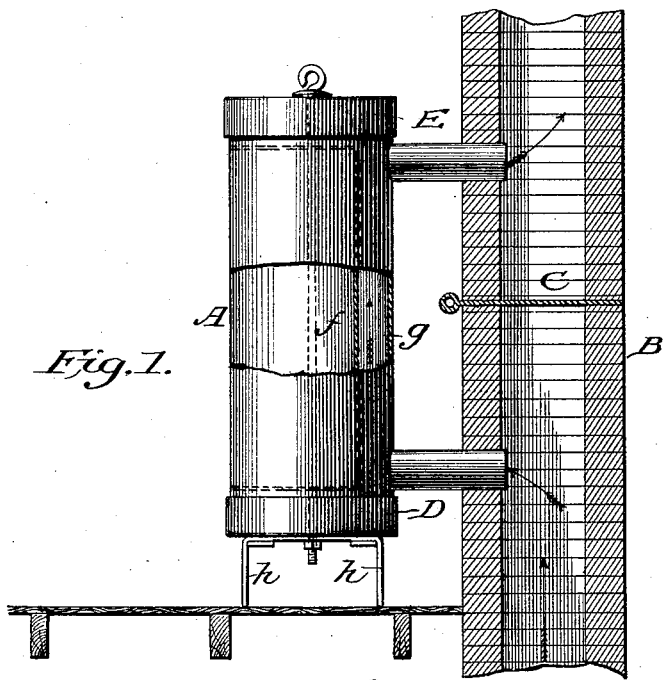
Fig. 1.
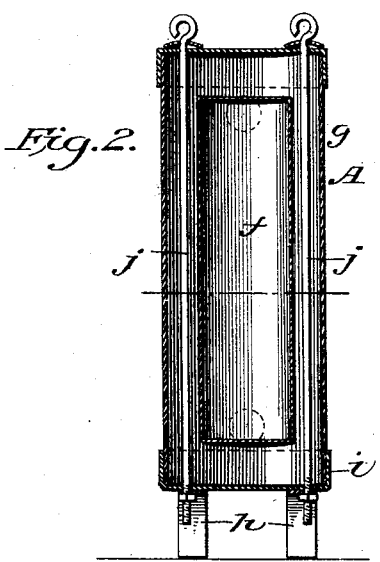
Fig. 2.
Witnesses.  Fig. 3.  Inventor:
Andrew J. Roe
Charles W. Wolley
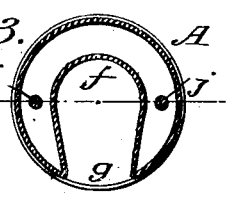
Miss Mary Roe.
THE NORRIS PETERS CO., PHOTO-LITHO., WASHINGTON, D. C.

UNITED STATES PATENT OFFICE.

MARY ROE, OF DAYTON, MINNESOTA.

HEATING APPARATUS.

SPECIFICATION forming part of Letters Patent No. 479,463, dated July 26, 1892.

Application filed November 16, 1891. Serial No. 412,107. (No model.)

*To all whom it may concern:*

Be it known that I, MARY ROE, a citizen of the United States, residing in the township of Dayton, in the county of Hennepin and State of Minnesota, have invented a new and useful Heating Apparatus, of which the following is a specification.

My invention relates to improvements in heating apparatus in which drums operate in conjunction with obstructions in chimneys; and the objects of my improvements are, first, to obtain warmth by the use of the product of combustion in its passage to the open air; second, to combine in a heating-drum good heating capacity with simplicity of construction, and, third, to avoid complexities that would induce the accumulation of soot and render its perfect expulsion impossible. I attain these objects by the mechanism illustrated in the accompanying drawings, in which—

Figure 1 is a view of the drum placed in connection with the chimney; Fig. 2, a vertical sectional view of said drum, and Fig. 3 a view of a horizontal section on the line shown in Fig. 2.

A is the drum; B, section of chimney; C, obstruction in chimney; D, section of pipe connecting chimney B with drum A near its base; E, section of pipe connecting chimney B with drum A near its top. Of these the construction of the drum is all that is claimed.

Drum A consists of two cylinders, one within the other. The inner cylinder $f$ is open its entire length. A portion of the outer cylinder $g$, of the same length as cylinder $f$, is removed, giving space for a cavity in the front part of the drum. The lines of cylinders $f$ and $g$ are parallel until each side of cylinder $f$ as it nears the front rounds outward in the form of a half-circle and is attached to the corresponding side of cylinder $g$. Cylinder $f$ is finished with heads at both ends, the heads aforesaid being attached to the portions of cylinder $g$ below and above the cavity, and thus finished it incloses the cavity. The heads of cylinder $g$ are removable. The standards $h$ of drum A may be attached to the removable section $i$, (shown in Fig. 2,) the form of removable section to which the standards are to be attached forming no part of my invention. The removable heads of cylinder $g$ and the removable section $i$ are held in place by removable rods $j\,j$, which pass through the upper head downward through the inner part of the drum, thence through the lower head and the removable section $i$ into nuts, the lower ends of said rods being threaded for the reception of nuts. The upper ends of the rods $j\,j$ are finished with handles to prevent their turning when the nuts aforesaid are being adjusted. Caps encircle the rods $j\,j$ below the handles aforesaid, pressing downward upon the upper head of cylinder $g$ and preventing the escape of gas from the drum. At the back side and near the end are holes for the admittance of pipe. The advantages of this drum are that, while it allows the hot air to pass below and above a cavity, it has no acute angles and no interior complications, thus presenting the greatest possible surface from which to radiate heat compatible with simplicity of construction, and also the least possible tendency to the accumulation of soot and the greatest possible facilities for its expulsion.

I am aware that prior to my invention heating-drums have been made with removable heads; also, that standards of heating apparatus have been attached to removable frames, and that removable rods have been used to hold the heads of cylinders in place. I therefore do not claim such combinations, broadly; but What I do claim as my invention, and desire to secure by Letters Patent, is—

1. The combination, in a heating-drum, of removable heads held in place by removable rods encircled by caps which press downward upon the upper head of the drum, substantially as set forth, for the purpose specified.

2. The combination, in a heating-drum, of removable rods which pass downward through the upper head and inner part of the drum, thence through the lower head and removable section (to which standards are to be attached) into nuts, said rods being encircled by caps which press downward upon the upper head of the drum, all substantially as shown, for the purpose specified.

3. The combination, in a heating-drum, of hot-air spaces below and above a cavity, the inner and outer cylinders of said drum uniting on either side of the cavity in the form of a half-circle, all substantially as escribed, for the purpose specified.

MARY ROE.

Witnesses:
E. P. HUGHES,
A. J. ROE.